(12) United States Patent
Costa et al.

(10) Patent No.: US 7,937,640 B2
(45) Date of Patent: May 3, 2011

(54) VIDEO OVER IP NETWORK TRANSMISSION SYSTEM

(75) Inventors: Pierre Costa, Austin, TX (US); Ahmad C. Ansari, Cedar Park, TX (US); David B. Hartman, Austin, TX (US); Vernon D. Reed, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1170 days.

(21) Appl. No.: 11/641,988

(22) Filed: Dec. 18, 2006

(65) Prior Publication Data

US 2008/0148329 A1 Jun. 19, 2008

(51) Int. Cl.
*H03M 13/00* (2006.01)
(52) U.S. Cl. .................................. 714/752; 711/109
(58) Field of Classification Search ................. 714/752; 725/109
See application file for complete search history.

(56) References Cited

U.S. PATENT DOCUMENTS

| 4,701,923 | A | 10/1987 | Fukasawa et al. |
| 6,490,705 | B1 | 12/2002 | Boyce |
| 6,895,021 | B1 * | 5/2005 | Vedder ........................ 370/474 |
| 7,047,190 | B1 | 5/2006 | Kapilow |
| 2002/0069038 | A1 | 6/2002 | Cooper |
| 2002/0116715 | A1 | 8/2002 | Apostolopoulos |
| 2003/0126238 | A1 | 7/2003 | Kohno et al. |
| 2004/0066793 | A1 | 4/2004 | Van Der Schaar |
| 2005/0091048 | A1 | 4/2005 | Thyssen et al. |
| 2005/0111371 | A1 | 5/2005 | Miura et al. |
| 2009/0086800 | A1 * | 4/2009 | Cioffi ........................... 375/222 |

FOREIGN PATENT DOCUMENTS

| EP | 0794631 A2 | 9/1997 |
| EP | 1710941 A1 | 10/2006 |
| WO | WO-0219709 | 3/2002 |
| WO | WO-2008076894 A2 | 6/2008 |

OTHER PUBLICATIONS

"International Application Serial No. PCT/US2007/087595 Search Report mailed Jun. 30, 2008", 6 pgs.
"International Application Serial No. PCT/US2007/087595 Written Opinion mailed Jun. 30, 2008", 11 pgs.
Nafaa, A., et al., "Joint loss pattern characterization and unequal interleaved FEC protection for robust H.264 video distribution over wireless LAN", *Computer Networks, Elsevier Science*, 49 (6), (Dec. 19, 2005), 766-786.

* cited by examiner

*Primary Examiner* — Guy J Lamarre
(74) *Attorney, Agent, or Firm* — Pablo Meles; Guntin Meles & Gust, PLC

(57) ABSTRACT

Methods are disclosed for maintaining a quality video stream in Internet Protocol (IP) mode include dynamically adjusting IP packet-loss periods and loss distances between IP packet-loss events.

10 Claims, 8 Drawing Sheets

VIDEO OVER IP NETWORK TRANSMISSION SYSTEM

FIELD

This disclosure relates generally to transmitting Internet Protocol television (IPTV) content over a local network. In particular, this disclosure relates to a home viewing network for IPTV.

BACKGROUND

IPTV networks need to be highly reliable. One of the most error-prone parts of the network is the local area network (LAN), where video/IP, voice/IP and data packets are routed to various equipment units. One LAN is the home network (HN), in a private house. In particular, the video packets travel throughout the house to terminate on set-top-boxes (STBs) to be rendered into video images. The video packets are prone to significant error and loss that results in subsequent display impairments observed by the viewer.

With recent increases in network bandwidth, the ease of interconnectedness of users through the global Internet, and the increasing volume of digital data processed by business and consumer users, the demands for network-based transfer via packets are ever growing. In particular, home users desire to transfer packets, over their home viewer networks of ever higher bandwidths, and at ever longer distances.

Such data transfer paths not only experience high bottleneck bandwidths and round-trip delays due to geographical distance, but they also experience periods of packet losses, and variable delays due to the media itself, such as a data loss in a wireless home viewing network.

DESCRIPTION OF DRAWINGS

The disclosure is illustrated by way of example and not limitation in the figures of the accompanying drawings, in which like references may indicate similar elements and in which.

DETAILED DESCRIPTION

In the following description, for purposes of explanation, numerous specific details are set forth in order to provide a thorough understanding of an embodiment of the present disclosure. It will be evident, however, to one skilled in the art that the present disclosure may be practiced without these specific details.

As used herein a "home viewing network" or "home network" refers to a local area network (LAN) that has a video server (e.g., an Internet Protocol (IP) Television (TV) server referred to as an IPTV server, etc.), a network interface (residential gateway, router, etc.), one or more Set-Top Boxes (STBs), and one or more viewing devices. The video server receives and broadcasts, within the home network, video streams associated with TV programming (e.g., broadcasts, pay-per view broadcasts, Internet video broadcasts, etc.). The video server also broadcast local IP video originating from with the home viewing network. That is, the IP video service (implemented in an IP video STB) receives encrypted IP video content from external TV programming sources (also referred to as "IPTV service provider") and from local sources supplying local video content.

Figure 1:
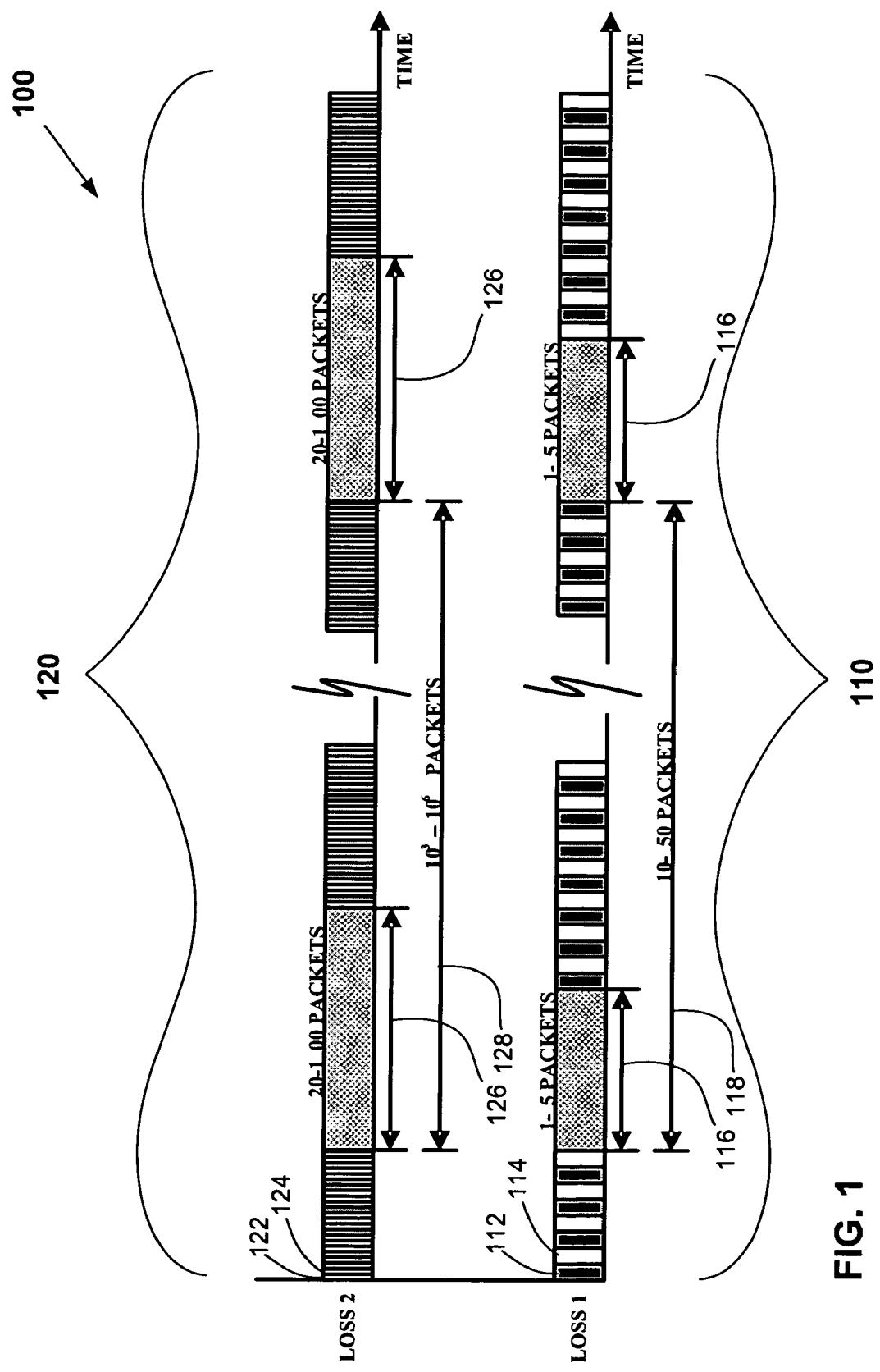
FIG. 1 is a diagram of two observed losses for both packet loss and period loss in an Internet Protocol home network, according to an example embodiment of the disclosure.

FIG. 1 is a diagram of two observed error profiles, 110 and 120, for both packet loss and period loss in an Internet Protocol home network, according to an example embodiment of the disclosure. Although an IP home network is referred to hereinafter, it is understood that the IP home network can also mean any LAN.

A first IP error profile 110 exhibits individual IP packets, two adjacent of which are denominated as 112 and 114, that stream from left to right. The first IP transmission 110 also exhibits an error profile with a first-observed loss period 116 of from 1 to 5 packets according to an example embodiment. The first-observed loss period 116 is noted at two locations in the IP packet stream. The first IP error profile 110 also exhibits as part of the error profile, a first-observed loss distance of between 10 and 50 packets between the two occurrences of the first-observed loss periods 116.

At another time in observing the IP packet stream, the second IP error profile 120 is observed. The second IP error profile 120 exhibits individual IP packets, two adjacent of which are denominated as 122 and 124, that stream from left to right. The second IP error profile 120 also exhibits an error profile with a first-observed loss period 126 of from 10-100 packets according to an example embodiment. The first-observed loss period 126 is noted at two locations in the IP packet stream. The second IP error profile 120 also exhibits as part of the error profile, a first-observed loss distance of between 103 and 106 packets between the two occurrences of the first-observed loss periods 126.

Either IP error profile, 110 and 120 can be noted as a "first-observed" loss profile because of the method embodiments. In a first method embodiment, the first IP error profile 110 is provided as a "pre-selected" IP transmission error profile, based upon a nominal choice of both loss period and loss distance. By "nominal" it can mean an industry-provided loss period and loss distance is shipped with equipment or software to build the forward error correction (FEC) system embodiments. In an embodiment, the nominal choice of both loss period and loss distance are numbers that have been derived from industry experience for a given type of LAN.

For example a home network LAN may have one set of nominal choice for loss period and loss distance, but a business LAN may a different set of nominal choice for loss period and loss distance.

In any event, where the first IP error profile 110 is provided as the pre-selected IP transmission, the second IP error profile 120 is provided as the first-observed IP error profile transmission, which contain a first-observed loss period 126 of 20 to 100 packets and a first-observed loss distance of between 103 and 106 packets between the two occurrences of the first-observed loss periods 126. In this method embodiment, the pre-selected loss period and loss distance are compared to the first-observed loss period and loss distance, and an instruction is sent to a FEC transmitter-generator to adjust the pre-selected loss period 116 and the pre-selected loss distance 118 to approach the first-observed loss period 126 and loss distance 128. By "approach" it is meant that an error-correction algorithm can be used, such as a Reed-Solomon algorithm or the like or others. Because of the high volume of packets in IP transmissions such as an IPTV transmission in a home network, an intermediate instruction within the home network embodiment can be sent that may not have matched exactly the first-observed loss period and loss distance. Similarly, the algorithm may have reference to a journal of recent behavior in loss period and loss distance that may mandate a different instruction than matching exactly the first-observed loss period and loss distance.

As the pre-selected loss profile is the first loss profile that is lodged in memory for a given method of IPTV transmission in a LAN, the method includes updating the pre-selected loss profile to a "first loss profile". The first loss profile may match exactly the first-observed loss profile. As set forth above, the first loss profile may approach but not match exactly the first-observed loss profile, because the first loss profile is established based upon an algorithm. Consequently, as the loss profile that is lodged in memory, changes from the pre-selected loss profile to the first loss profile, one may correctly refer to the pre-selected loss profile as the "zero$^{th}$ loss profile". Any given observed loss profile can be assigned to memory as an "n$^{th}$ loss profile" as an instruction loss profile for dynamically monitoring and adjusting the IPTV packet transmission.

Figure 2:
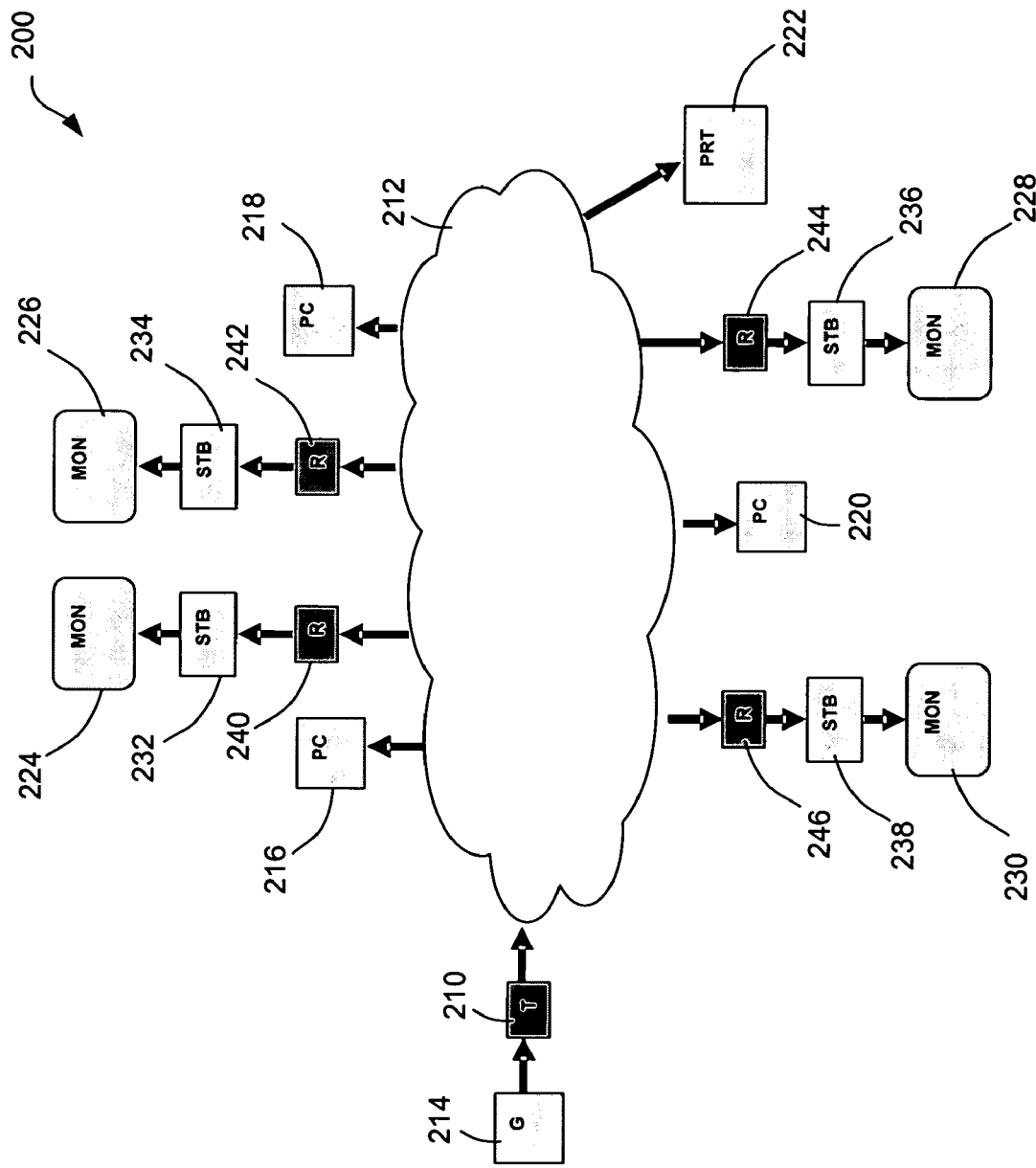
FIG. 2 is a diagram of a home network for distributing Internet Protocol video, according to an example embodiment of the disclosure.

FIG. 2 is a diagram of a home network 200 for distributing IPTV transmissions, according to an example embodiment of the disclosure. In an embodiment a FEC transmitter-generator block 210 is inserted at the edge of an IP home network 212. The IP home network 212 includes coupling to a gateway 214 and selected personal computers 216, 218 and 220. The IP home network 212 also includes coupling to a printer 222 according to an embodiment. The IP home network 212 also includes coupling to at least one monitor, four of which are depicted at 224, 226, 228, and 230. In an embodiment for each monitor, a corresponding set-top box (STB) is provided, respectively at 232, 234, 236, and 238. For each STB a FEC re-transmitter-regenerator block is inserted within the home network, respectively at 240, 242, 244, and 246.

In a method embodiment, a given FEC receiver-regenerator, e.g. receiver-regenerator 240, observes an IPTV transmission, including an indigenous error profile received from the FEC transmitter-generator 210. This means the FEC receiver-regenerator is collecting observed error coming from the HN link. The FEC receiver-regenerator 240, because it is constantly calculating FEC packet and checking the integrity of the incoming IPTV packets, compares a pre-selected or zero$^{th}$ error profile (including a pre-selected loss period and a pre-selected loss distance) to the first-observed error profile (meaning the first-observed loss period and the first-observed loss distance). Next, FEC the receiver-regenerator 240 calculates a first error profile (meaning a first loss period and a first loss distance). Then, the FEC receiver-regenerator 240 communicates with the FEC transmitter-generator 210 with an instruction to send parity packets in packet groups of the first-observed loss period, spaced apart by the first-observed loss distance, as the first error profile. And as a completed process loop, the FEC transmitter-generator 210 finally transmits-generates the IP packet stream with the first error profile, which includes the first loss period and the first loss distance, and which includes parity packet groups that fit the first error profile.

At a first iteration of the method, the FEC transmitter-generator 210 is transmitting the IPTV packet stream, but the first error profile has changed. The FEC receiver-regenerator 240, detects a second-observed error profile received from the FEC transmitter-generator 210. The FEC receiver-regenerator 240 compares the first error profile (including the first loss period and the first loss distance) to the second-observed error profile (meaning the second-observed loss period and the second-observed loss distance). Next, the FEC receiver-regenerator 240 calculates a second error profile (meaning a second loss period and a second loss distance). Then, the FEC receiver-regenerator 240 communicates with the FEC transmitter-generator 210 with data that defines the second error profile. And as second iteration in the completed process loop, the FEC transmitter-generator 210 finally transmits-generates the IPTV packet stream with the second error profile, which includes the second loss period and the second loss distance.

In another first-iteration embodiment, the method includes a calculation to cause the second error profile to approach but not match exactly the second-observed error profile. In this embodiment, an algorithm is used that uses a weighted average of performance between the FEC transmitter-generator 210 and the actual reception taken at the FEC re-transmittter-regenerator 240.

In another first-iteration embodiment, the method includes a calculation to cause the second error profile to approach but not match exactly the second-observed error profile. In this embodiment, an algorithm is used that uses a journal as a reference such that the response is factored by data lodged in the journal memory. Such data can factor in historical events such as the time of day. The journal memory can also contain factors such as lateral noise within the home IP network, and other factors.

In another first-iteration embodiment, the method includes a calculation to cause the second error profile to approach and overcompensate, but not match exactly the second-observed error profile. In this embodiment, the IPTV system appreciates maximum transmission and calculation capabilities, and creates a loss period that is more than the second-observed loss period. Similarly, and optionally, the ITPV system creates a loss distance that is the same as the second-observed, but the bandwidth is calculated larger than an exact match.

Figure 3:
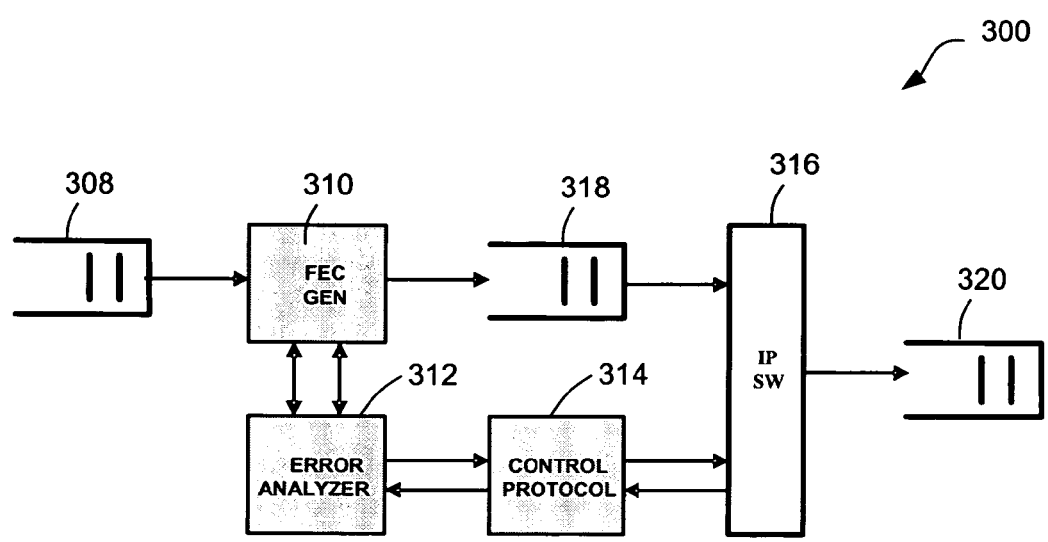
FIG. 3 is a schematic diagram of a forward error correction transmitter-generator for an Internet Protocol home network, according to an example embodiment of the disclosure.

FIG. 3 is a schematic diagram of a FEC transmitter-generator 300 for an IP home network, according to an example embodiment of the disclosure. The transmitter-generator 300 includes three functional blocks. A FEC transmitter-generator 310 absorbs the incoming video IP packet stream 308. The FEC transmitter-generator 310 also calculates FEC packets to transmit, that is based upon a given FEC instruction such as matching exactly or approaching an observed error profile. The FEC transmitter-generator 300 also includes an error analyzer 312 that uses algorithms to dynamically change the loss period and loss distance parameters. The FEC transmitter-generator 300 also includes a transmitter control protocol 314 that tests the link between the transmitter-generator 300 and a given re-transmitter-regenerator. An incidental block is also represented as an IP-related software application 316 that interfaces further into the home IP network. The transmitter-generator 300 is also illustrated sending a manipulated packet stream 318 toward the IP-related software application 316, which in turn sends the manipulated packet stream 318 further into the home IP network.

Figure 4:
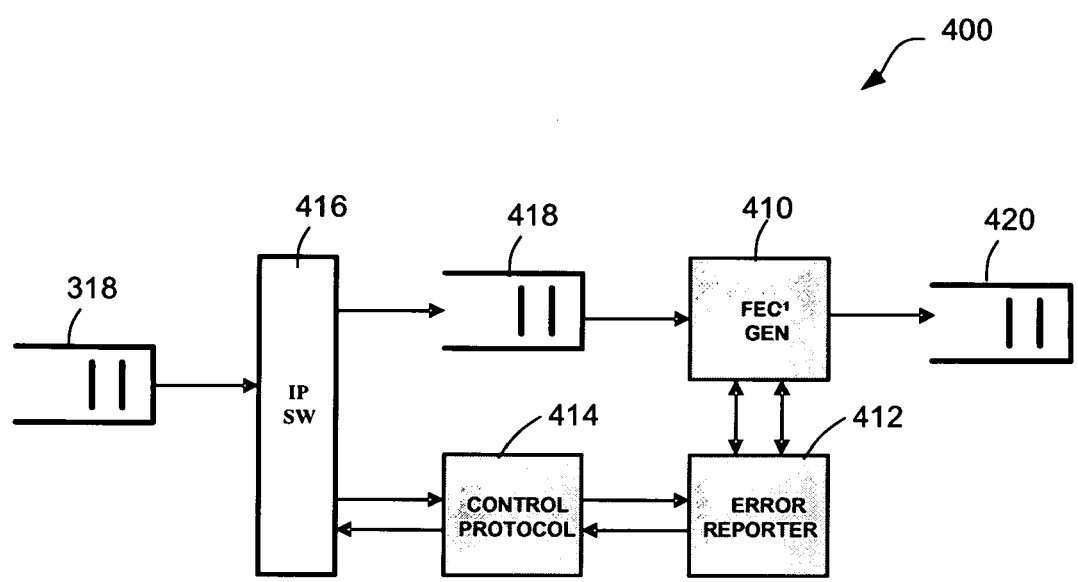
FIG. 4 is a schematic diagram of a forward error correction receiver-regenerator for an Internet Protocol home network, according to an example embodiment of the disclosure.

FIG. 4 is a schematic diagram of a FEC receiver-regenerator 400 for an IP home network, according to an example embodiment of the disclosure. The FEC receiver-regenerator 400 includes three function blocks. A FEC receiver-regenerator 410 observes errored packets and their indigenous error profile, such as by comparing parity packets. An error reporter 412 reports errors back to the FEC transmitter-receiver 310 (FIG. 3), such that the error profile can be adjusted according to the various embodiments. A receiver control protocol 414 is present to communicate with the transmitter control protocol 314 to verify data integrity. As illustrated, the manipulated packet stream 318 from FIG. 3 enters an IP software interface 416 within the IP home network that is related to the FEC receiver-regenerator 400, and the manipulated packet stream 318 becomes a manipulated packet stream 418 that is fielded at the FEC receiver-regenerator 410 for observing errored packets.

Figure 5:
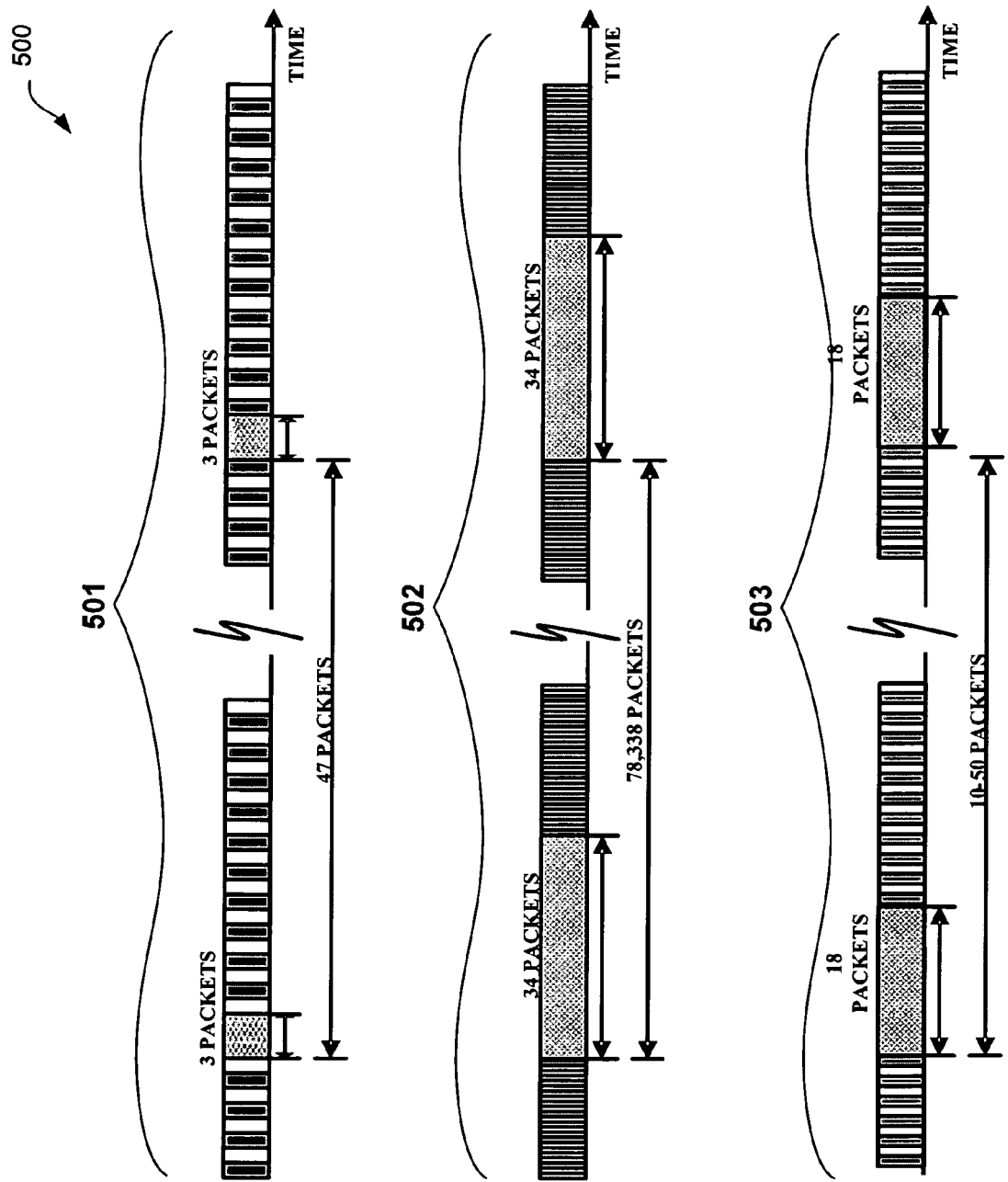
FIG. 5. is a diagram of three observed losses for both packet loss and period loss in an Internet Protocol home network, according to an example embodiment of the disclosure.

FIG. 5 is a diagram 500 of three observed loss profiles for both packet loss and period loss in an IP home network, according to an example embodiment of the disclosure. The loss profile 501 exhibits a loss period of 3 packets, over a loss distance of 47 packets. The loss profile 502 exhibits a loss period of 34 packets, over a loss distance of 78,338 packets. And the loss profile 503 exhibits a loss period of 18 packets, over a loss distance that ranges from 10 to 50 packets. In an embodiment, the loss profile 501 is a pre-selected, or zero$^{th}$ loss profile that is lodged in memory before operation of an IP home network. In this embodiment, the loss profile 502 is a first-observed loss profile, and the loss profile 503 is a second-observed loss profile.

In an embodiment, the loss profile 501 is a pre-selected loss profile and the loss profile 502 is a first-observed loss profile. The method of comparing the first-observed loss profile 502 with the zero$^{th}$ or pre-selected loss profile 501 includes lodging the differences in system memory and reporting the differences to the error analyzer in the IP receiver-transmitter. Next, the IP receiver-transmitter overwrites the memory location of the pre-selected loss profile 501 with the first-observed loss profile 502, and instructs the IP receiver-transmitter to send parity packet periods that are proportional to the first-observed loss profile 502. These parity packet periods are denominated as the "first loss profile". "Proportional" can mean the parity packets at least match up with observed lost packets, but it can also mean excess parity packets that overlap the period of observed lost packets and thereby assure that the rendered video has a better quality.

Next, the method continues by comparing a second-observed loss profile 503 with the first loss profile (which is proportional or exactly the same as the first-observed loss profile 502), and the method includes lodging the differences in system memory and reporting the differences to the error analyzer in the IP receiver-transmitter. Next, the IP receiver-transmitter overwrites the memory location of the first-observed loss profile 502 with the second-observed loss profile 503, and instructs the IP receiver-transmitter to send parity packet periods that are proportional to the second-observed loss profile 503. These parity packet periods are denominated as the second loss profile.

The method has now completed two iterations and can proceed forward indefinitely.

Figure 6:
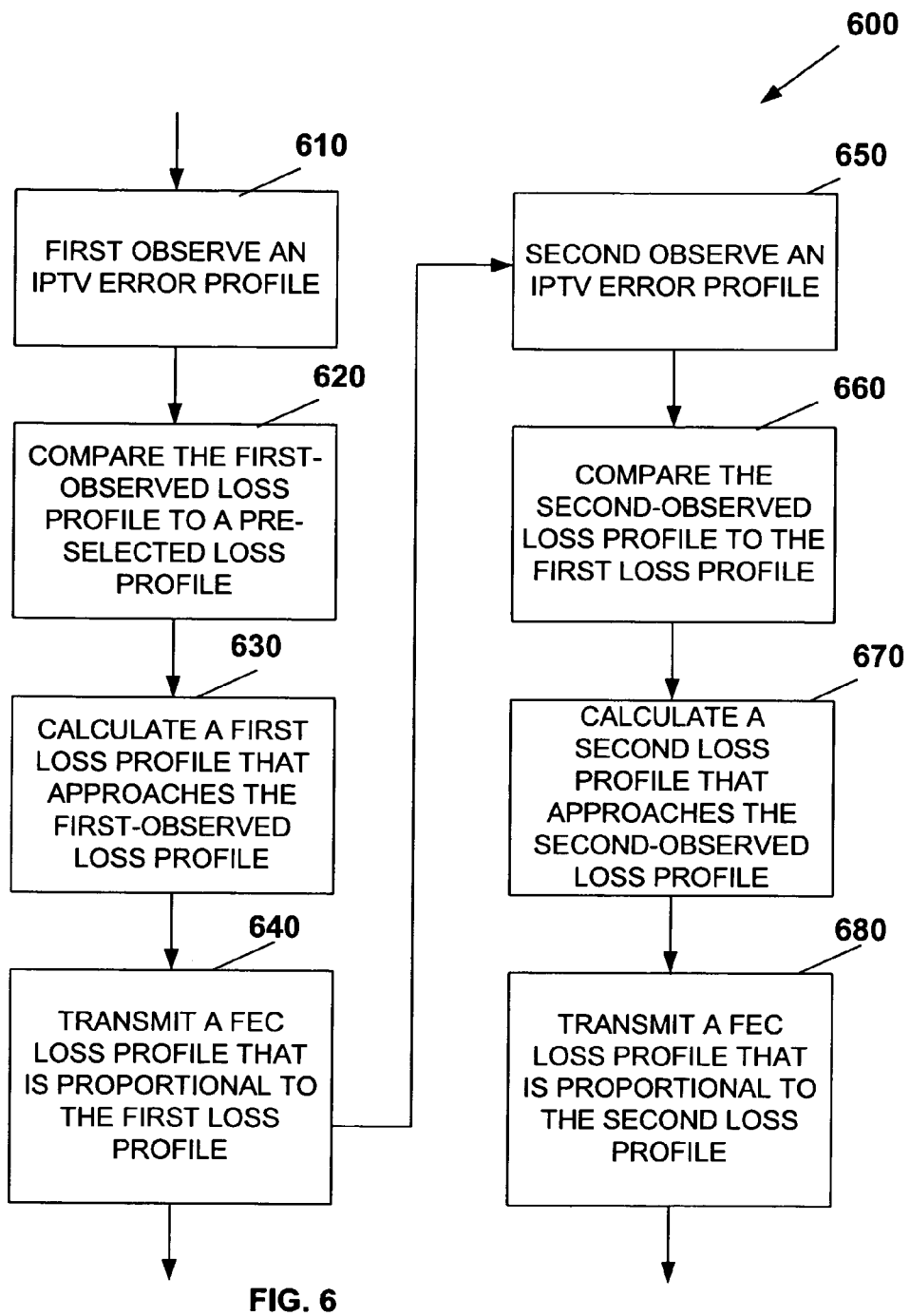
FIG. 6 is a diagram of a method for operating forward error correction in an Internet Protocol home network according to an example embodiment of the disclosure.

FIG. 6 is a diagram of a method 600 for operating FEC in an IP home network according to an example embodiment of the disclosure.

At 610, a first-observed loss profile is recorded in an IPTV stream.

At 620, a pre-selected loss profile is compared to the first-observed loss profile.

At 630, a calculated first loss profile is generated that approaches the first-observed loss profile.

At 640, a FEC loss profile is transmitted from a transmitter-generator to a re-transmitter-regenerator, such as in parity packets based upon the first loss profile. In an embodiment, the method commences at 610 and terminates at 640.

In an embodiment, the method performs an iteration by cycling back to 610. Consequently, at 650, a second-observed loss profile is recorded from the IPTV stream.

At 660, the first loss profile is compared to the second-observed loss profile.

At 670, a calculated second loss profile is generated that approaches the second-observed loss profile.

At 680, a FEC loss profile is transmitted from the transmitter-generator to the re-transmitter-regenerator, such as in parity packets based upon the second loss profile. In an embodiment, the method commences at 610 and terminates at 680.

It can be appreciated that this iterating loop can be repeated to dynamically address changes in an IPTV transmission such that at least video quality is made better than if no method is used.

Figure 7:
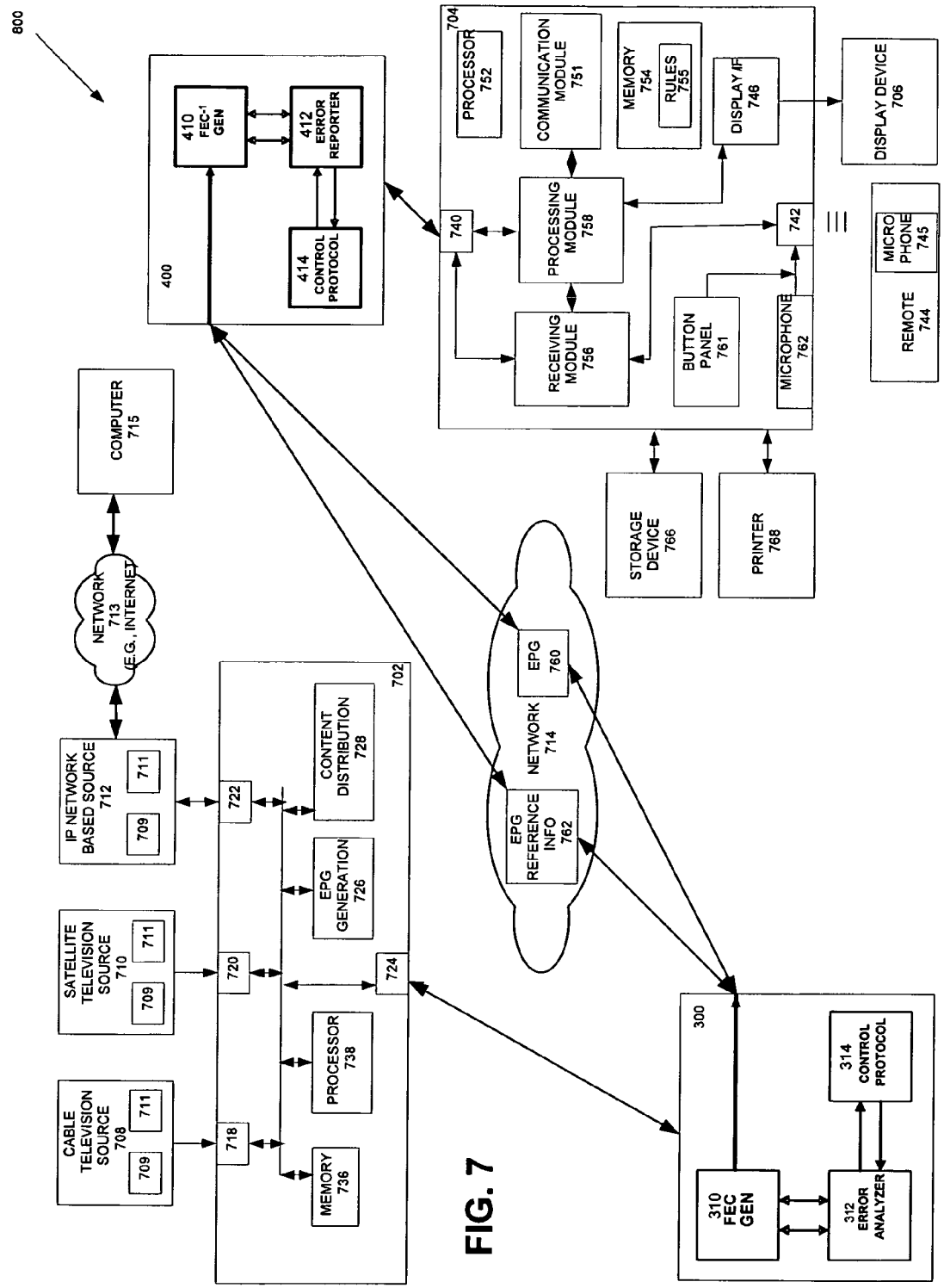
FIG. 7 is a diagram of an example network architecture for devices, machines, services, systems, and instructions to interact and perform any one or more of the forward error correction Internet Protocol home network methods discussed herein, according to an example embodiment of the disclosure.
Figure 8:
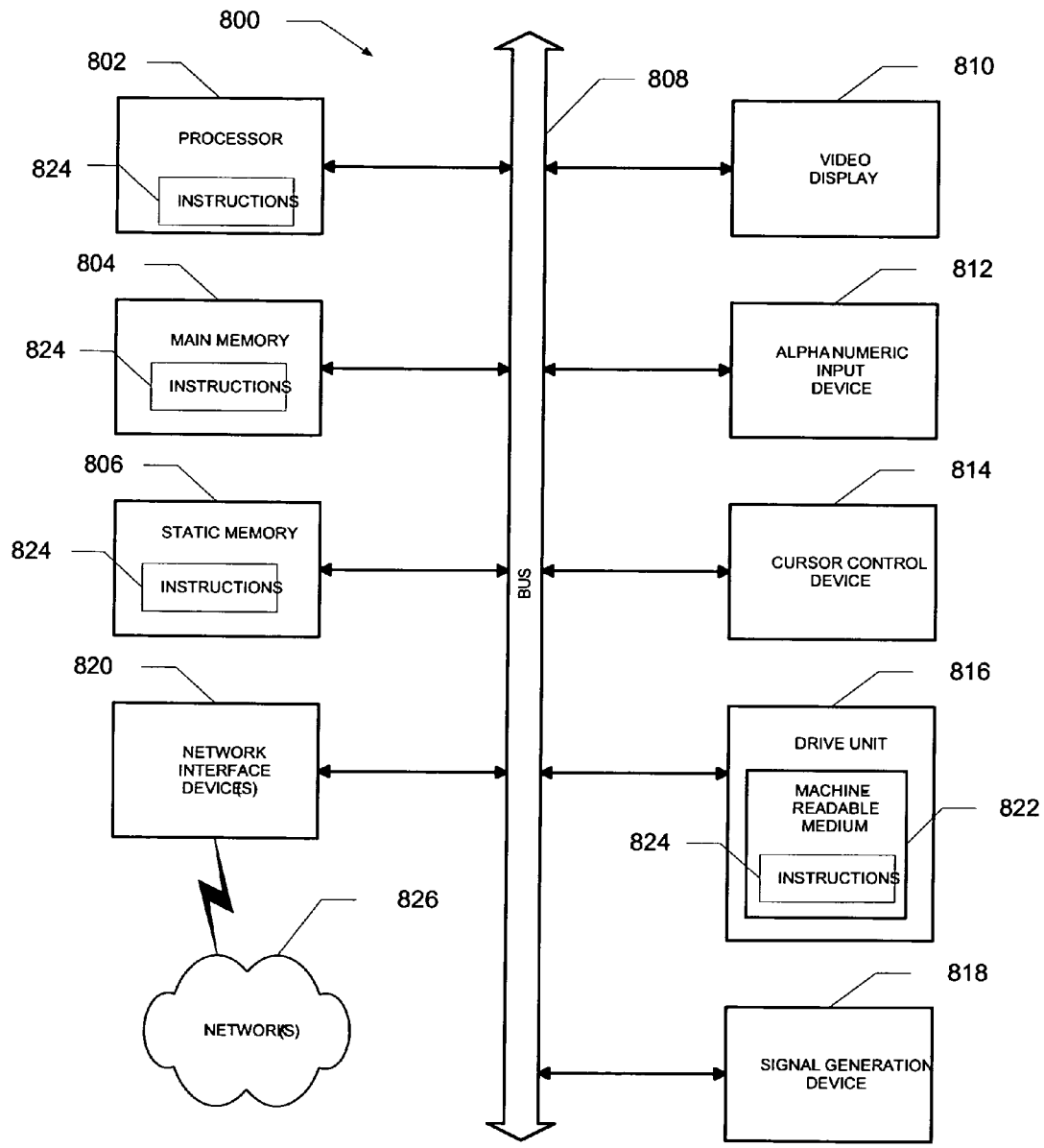
FIG. 8 is a diagram of an example machine architecture within which a set of instructions for causing the machine to perform any one or more of the forward error correction Internet Protocol home network methods discussed herein may be executed, according to an example embodiment of the disclosure.

FIGS. 7-8 are now presented for purposes of providing an example network architecture and machine architecture for which devices can interact to achieve the teachings and techniques presented herein. This layout and configuration is presented for purposes of illustration only and is not intended to limit the embodiments presented herein.

FIG. 7 is a diagram of an example network architecture 700 for devices, machines, services, systems, and instructions to interact and perform any one or more of the FEC method embodiments discussed herein, according to an example embodiment of the disclosure.

FIG. 7 may also be viewed as an example multimedia distribution system 700 that is implemented in accordance with at least one FEC method or device embodiment of the present disclosure. As shown, the system 700 includes a multimedia content provider 702, a set-top box 704, a display device 706, a plurality of multimedia content sources, such as cable television source 708, satellite television source 710, and IP network-based source 712.

In the illustrated embodiment, the channel content forwarding provider 702 and the set-top box 704 are connected via an IP home network 714, where the IP home network 714 can include a cable television distribution network, a satellite distribution network, a broadcast television distribution network, a data packet-based computer network (e.g., an Ethernet network), and the like. Likewise, the channel content sources 708, 710, and 712 may be connected via one or more networks to the content provider 702.

As shown, the channel content provider 702 can include one or more interfaces 718, 720, and 722 to interface with the channel content sources 708, 710, and 712, respectively, and an IP interface 724 to interface with the set-top box 704 via the network 714 and the FEC transmitter-generator 300 and the FEC re-transmitter-regenerator 400. The interfaces 718, 720, 822, and 724 may include any of a variety of interfaces, such as a coaxial cable interface, a wireless interface for receiving satellite or broadcast transmissions, or a data packet network interface, such as an Ethernet interface or a router. The IP Network based source 712 is shown to be connected to a computer 715 over a network 713, e.g., Internet thereby providing a communication path between a user operating the set-top box 704 and a user operating the computer 715. The channel content provider 702 further may include an EPG generation module 726 and a multimedia channel content distribution module 728. The modules 726 and 728 may be implemented as software, hardware, firmware, or combinations thereof. To illustrate, the channel content provider 702 may include a memory 736, e.g., static random access memory (SRAM) and one or more processors 738, where the modules 726 and 728 may be implemented in part or in whole as executable instructions stored in the memory 736 and executed by the processor 738 to perform the techniques described herein.

As also shown, the set-top box 704 may include an interface 740 for interfacing with the channel content provider 702 via the network 714, a control interface 742 to receive user input and commands, e.g., via a remote control 744, a button panel 761, a microphone 762 and a display interface 746 to interface with the display device 706. The interface 740 may include any of a variety of appropriate interfaces, such as a coaxial cable interface, a wireless interface to send and receive wireless transmissions, or a data packet-based network interface, such as an Ethernet interface. The control interface 742 may include any of a variety of interfaces, such as an infrared interface, a wireless interface, or the button panel 761. The remote control 744 is shown to include a microphone 745 for receiving voice commands and the set-top box 804 is also shown to include a microphone 862 for receiving voice commands.

The set-top box 704 is further shown to be connected to a storage device 766, e.g., hard disk, compact disk, floppy, universal serial bus key, etc. for storing files, and a printer 768 for printing files. The set-top box 704 further may include a processing module 758, a receiving module 756, and a communication module 751. The processing module 758, receiving module 756, and communication module 751 may be implemented as hardware, software, firmware, or combinations thereof. To illustrate, the set-top box 704 may include a memory 754 and one or more processors 752, where one or both of modules 758 and 756 are implemented as executable instructions stored in memory 754 and executed by the processor 752 to implement techniques described herein. The memory is further shown to include rules 755 that may be utilized to control the use of images that may be captured from content that is displayed on the display device 706. For example the rules 755 may embodied as a digital rights management license that may be distributed with content from the content source 708, 710, and 712. As is well known in the art, the license may include rules 755 that may restrict the use of the associated content.

In a particular embodiment, the channel content provider 702 receives data representative of multimedia channels from each of the different channel content sources 708, 710, and 712, and provides data representative of at least a subset of the multimedia channels to the set-top box 704 for processing and display at the display device 706 and/or output via an audio device (not shown). In an embodiment, the channel content provider includes a channel content module 709 that communicates data that includes channel content and a control module 711 that communicates data that includes control information, e.g., digital license that includes a rule that restricts the use of associated channel content. Moreover, in a particular embodiment, the channel content provider 702 provides data representative of an electronic programming guide (EPG) 760 to the set-top box 704 for processing by the processing module 758 and for navigation by a user via the control interface 742 and the processing module 758. As described herein, the EPG 760, in one embodiment, represents a unified EPG including listings for the multimedia channels provided by two or more channel content sources that provide multimedia channels to the channel content provider 702. To illustrate, in a particular embodiment, the EPG 760 represents a navigable program guide or user interface whereby an end user, via the remote control 744 or other input device, can direct the processing module 758 to navigate between multimedia channels by selecting an icon or other graphical representation of the desired channel as represented by a graphical display of the EPG 760. The EPG 760 may combine representations of all of the multimedia channels from different content sources in a single list or different lists for different content sources may be displayed concurrently by the EPG 760. Moreover, multimedia channels may be organized within the EPG 760 based on any of a variety of characteristics, such as by the program content of the multimedia channels, where the program content describes the genre or categorization of the video/audio program represented by the multimedia channel. Examples of various genres or categories include a "comedy" genre, an "action" genre, a "family" genre or "children" genre, a "romance" genre, a "science-fiction" genre, and the like.

FIG. 8 is a diagram of an example machine architecture within which a set of instructions for causing the machine to perform any one or more of the FEC delivery methods discussed herein may be executed, according to an example embodiment of the disclosure. Accordingly, FIG. 8 shows a diagrammatic representation of a machine in the example form of a computer system 800 within which a set of instructions, for causing the machine to perform any one or more of the FEC methodologies discussed herein, may be executed.

In alternative embodiments, the machine operates as a standalone device or may be connected e.g., networked to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 e.g., a central processing unit (CPU) a graphics processing unit (GPU) or both, a main memory 804 and a static memory 806, which communicate with each other via a bus 808. The computer system 800 may further include a video display unit 810, e.g., a liquid crystal display (LCD) or a cathode ray tube (CRT). The computer system 800 also includes an alphanumeric input device 812, e.g., a keyboard, a cursor control device 814, e.g., a mouse, a disk drive unit 816, a signal generation device 818, e.g., a speaker and a network interface device 820.

The disk drive unit 816 includes a machine-readable medium 822 on which is stored one or more sets of instructions, e.g., software 824 embodying any one or more of the FEC methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate exemplary embodiment.

What is claimed is:

1. A method for an internet protocol television (IPTV) network, comprising:
    comparing a pre-selected error profile, to a first-observed error profile in an IPTV network, wherein each of the pre-selected error profile and the first-observed error profile include a loss period measured in sequential packets and a loss distance measured in a packet count between two spaced-apart and adjacent loss periods; and
    instructing a FEC transmitter-generator to generate a first error profile that is proportional to the first-observed error profile.

2. The method of claim 1, wherein instructing the FEC transmitter-generator includes instructing the FEC transmitter-generator to match exactly the first error profile to the first-observed error profile.

3. The method of claim 1, further including after instructing the method including:
    comparing the first error profile to a second-observed error profile; and
    instructing the FEC transmitter-generator to generate a second error profile that is proportional to the second-observed error profile.

4. The method of claim 3, wherein instructing the FEC transmitter-generator includes instructing the FEC transmitter-generator to match exactly the second error profile to the second-observed error profile.

5. The method of claim 1, further including receiving an IPTV transmission at a forward error-correction (FEC) transmitter-generator at an edge of the IPTV network, followed by recognizing the first-observed error profile.

6. A system comprising:
    memory having a repository with a given home internet protocol (IP) network;
    a forward error-correction (FEC) transmitter-generator; and
    a FEC retransmitter-regenerator, and wherein the memory includes:
    instructions for receiving an IPTV transmission at a forward error-correction (FEC) transmitter-generator, and recognizing a first-observed error profile, including a loss period measured in sequential packets and a loss distance measured in a packet count between two spaced-apart and adjacent loss periods;
    instructions for comparing a pre-selected error profile, to the first-observed error profile; and
    instructions for generating a first error profile that is proportional to the first-observed error profile.

7. The system of claim 6, wherein the instructions for generating include instructions for matching exactly the first error profile to the first-observed error profile.

8. The system of claim 6, further including:
    instructions for comparing the first error profile to a second-observed error profile; and
    instructions for generating a second error profile that is proportional to the second-observed error profile.

9. A machine-accessible medium having instructions embedded thereon, the instructions when accessed by an IP home network perform the method of:
    comparing a pre-selected error profile in an internet protocol (IP) television transmission, to a first-observed error profile;
    instructing a transmitter-generator attached to the IP home network to generate a first error profile that is proportional to the first-observed error profile; and
    receiving an IPTV transmission at the forward error-correction (FEC) transmitter generator, and recognizing the first-observed error profile, including a loss period measured in sequential packets and a loss distance measured in a packet count between two spaced-apart and adjacent loss periods.

10. The medium of claim 9, wherein the instructions are lodged in the FEC transmitter-generator.

\* \* \* \* \*